W. HAY.
AUTOMOBILE SIGNAL.
APPLICATION FILED JUNE 11, 1918.
1,301,842.
Patented Apr. 29, 1919.
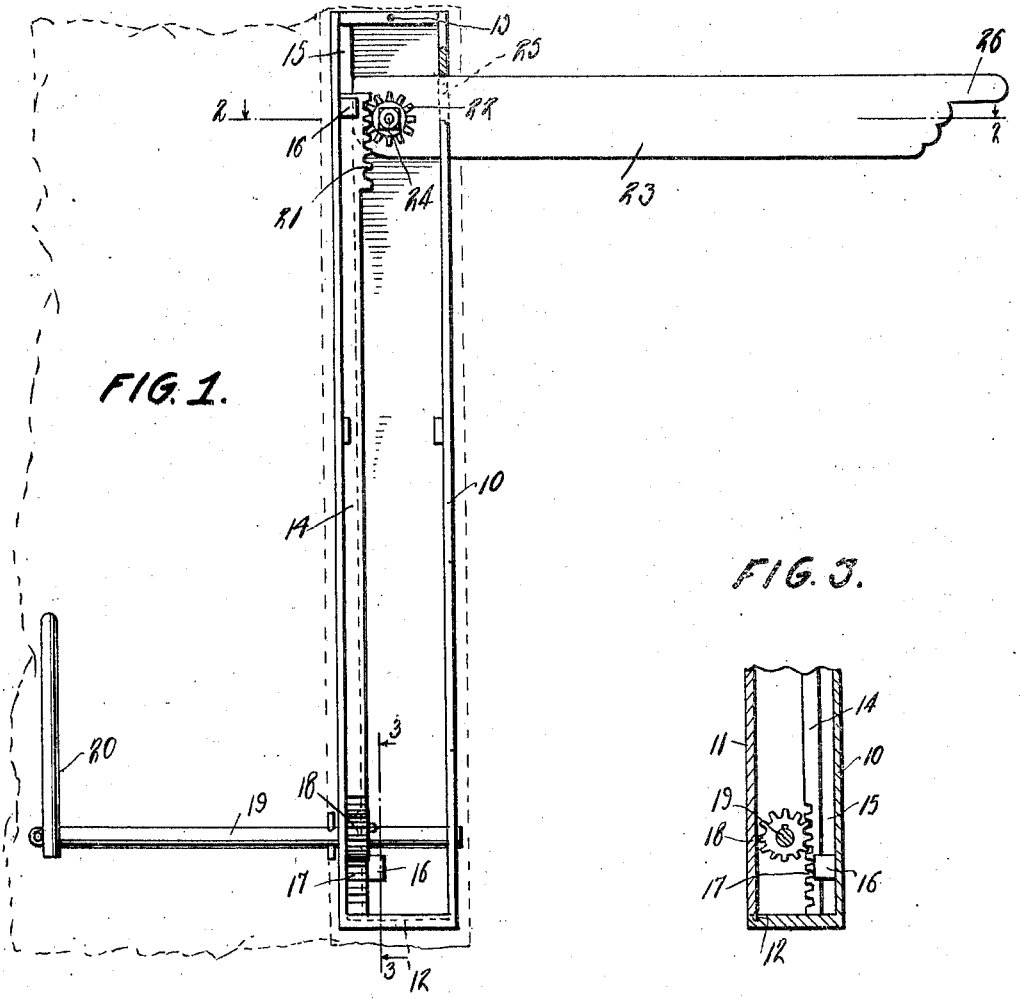
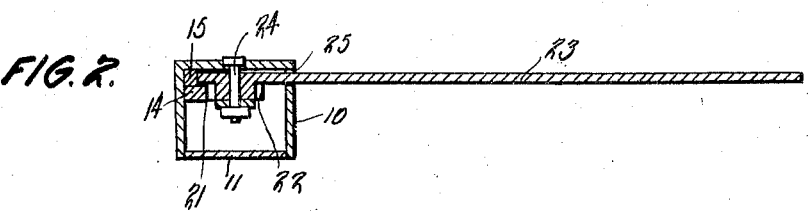
Witnesses
W. C. Fielding
A. P. Hollingsworth
Inventor
William Hay
By Richard B. Owen
Attorney

UNITED STATES PATENT OFFICE.

WILLIAM HAY, OF HOLYOKE, MASSACHUSETTS.

AUTOMOBILE-SIGNAL.

1,301,842.  Specification of Letters Patent.  Patented Apr. 29, 1919.

Application filed June 11, 1918. Serial No. 239,393.

*To all whom it may concern:*

Be it known that I, WILLIAM HAY, a citizen of Great Britain, a resident of Holyoke, Mass., and who on May 18th, 1917, declared his intention to become citizen of the United States, residing at Holyoke, in the county of Hampden and State of Massachusetts, have invented certain new and useful Improvements in Automobile-Signals, of which the following is a specification.

This invention relates to an automobile signaling device and has for its object to provide a simple, and easily attached indicator for application to the sides of an automobile wind shield to indicate the direction in which the vehicle is about to turn, the device being so placed as to be readily operated by means of a lever, actuated either by hand or by foot power.

With these objects in view, together with others which will appear as the description proceeds, the invention resides in the novel formation, combination and arrangement of parts, all as will be described more fully hereinafter, particularly pointed out in the claim, and illustrated in the accompanying drawings, in which:

Figure 1 is a rear elevation of the signal device set to warn other vehicles and pedestrians that a turn is to be made to the right.

Fig. 2 is a horizontal, sectional view through the device on the line 2—2 of Fig. 1, and Fig. 3 is a vertical, sectional view on line 3—3 of the same figure.

In the drawings is shown in dotted lines a portion of the wind shield of an automobile, to each side edge of which on the rear face of the wind shield is attached an upright casing 10 of box like form having a removable front 11 held in place by a tongue 12 on its lower end engaging a groove in the bottom of the casing and a screw 13 passing through the top of the front 11 and threaded into the top of the casing 10. The casing 10 is both narrow laterally and shallow from front to rear and extends from the floor of the automobile upwardly to the joint between the two sections of the wind shield.

Slidable longitudinally within this elongated casing is a bar 14 held in contact with a longitudinal rib 15 extending from end to end of the casing, by holding blocks 16 fixed against the wall of the casing. This rib forms a slideway for the bar 14 and in connection with the blocks 16, hold the bar in proper relation to other parts of the signal device. On the rear face of the bar 14 at the lower end thereof, are a series of teeth 17 which form a rack with which meshes a pinion 18 keyed on a horizontal shaft 19 rotatable in suitable bearings on the sides of the casing 10, said shaft extending toward the center of the automobile for a suitable distance near the floor thereof and at its inner end has fixed thereon a lever 20 which may be operated either by hand or by foot. Upon movement of the lever in one direction or the other, the shaft 19 will be rocked and the pinion 18 thereon engaging the rack 17 will raise or lower the bar 14.

On the outer side of the bar 14 at its upper end is a second rack 21 with which is engaged a pinion 22 rigidly secured to one end of a semaphore or signal arm 14, mounted to swing on a pin or bolt 24 passing through the pinion 22, signal arm 23 and front wall of the casing 10. When the signal is not in use, it hangs suspended and wholly within the casing 10, as in dotted lines in Fig. 1, but when the shaft 19 is turned to lower the bar 14 into the position indicated in Fig. 1, the rack 21 turning the pinion 22 will swing the signal arm outwardly into horizontal position, the arm passing through a longitudinal slot 25 formed in the outer side of the casing. In this position, the signal arm 23 having a pointer 26 on its outer end, will show clearly the direction which the vehicle proposes to take, and after making the turn, a reverse movement of the shaft 19 will lower the signal arm and cause it to enter the casing. Preferably the top of the slot 25 through which the signal arm swings terminates at such a distance below the top of the casing that when the arm is in operative position, its upper edge will contact with the top of the slot which forms a stop for the signal arm and maintains it in a horizontal position.

In the use of this signaling device, it is to be understood that one will be secured at the right side of the vehicle and a similar one at the left side, the signal arms of each device being arranged to swing outwardly. The operating shaft 19 extends toward the center of the car and terminates at such points that the levers 20 will be in suffidently close relation as to be readily operated by either hand or foot.

The foregoing description and the drawings have reference to what may be considered the preferred, or approved form of my invention. It is to be understood that I may make such changes in construction, arrangement and combination of parts, materials, dimensions, et cetera, as may prove expedient and fall within the scope of the appended claim.

Having thus fully described my invention, what I claim as new and desire to secure by Letters Patent, is:

A signal comprising an upright box-like casing adapted to be secured to the wind shield of an automobile and having an upright slot in the side thereof, guides therein, a signal arm pivotally mounted in the upper portion of the casing and adapted to swing into and out of the same through said slot, a pinion fixed to the signal arm around its pivot, a shaft journaled in the lower portion of said casing and extending through its other side and inward along the floor of the automobile, a lever on said shaft for rocking the same, a pinion fast on said shaft within the casing and standing in a plane at right angles to that of the other pinion, a bar slidable in said guides, a rack at the lower end of said bar in engagement with the pinion on the shaft, and a rack at the upper end of said bar in engagement with the pinion on said signal arm.

In testimony whereof I affix my signature in presence of two witnesses.

WILLIAM HAY.

Witnesses:
EDWARD J. WALPOLE,
ANNA CASSIDY.